United States Patent
Zhang et al.

(10) Patent No.: US 12,398,331 B2
(45) Date of Patent: Aug. 26, 2025

(54) CATALYST AND PROCESS USING SSZ-91 AND ZSM-12

(71) Applicant: CHEVRON U.S.A. INC., San Ramon, CA (US)

(72) Inventors: Yihua Zhang, Albany, CA (US); Adeola Florence Ojo, Pleasant Hill, CA (US); Guan-Dao Lei, Walnut Creek, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 18/038,240

(22) PCT Filed: Nov. 22, 2021

(86) PCT No.: PCT/US2021/060313
§ 371 (c)(1),
(2) Date: May 23, 2023

(87) PCT Pub. No.: WO2022/115371
PCT Pub. Date: Jun. 2, 2022

(65) Prior Publication Data
US 2024/0101912 A1    Mar. 28, 2024

Related U.S. Application Data

(63) Continuation of application No. 17/105,614, filed on Nov. 26, 2020, now abandoned.

(51) Int. Cl.
| | |
|---|---|
| *C10G 45/64* | (2006.01) |
| *B01J 23/42* | (2006.01) |
| *B01J 29/74* | (2006.01) |
| *B01J 29/80* | (2006.01) |
| *B01J 37/02* | (2006.01) |
| *B01J 37/04* | (2006.01) |
| *B01J 37/08* | (2006.01) |
| *C10M 109/02* | (2006.01) |
| *C10M 177/00* | (2006.01) |
| *B01J 29/06* | (2006.01) |
| *C10N 30/02* | (2006.01) |

(52) U.S. Cl.
CPC .......... *C10G 45/64* (2013.01); *B01J 29/7461* (2013.01); *B01J 29/7469* (2013.01); *B01J 29/80* (2013.01); *B01J 37/0201* (2013.01); *B01J 37/04* (2013.01); *B01J 37/088* (2013.01); *C10M 109/02* (2013.01); *C10M 177/00* (2013.01); *B01J 2029/062* (2013.01); *C10G 2300/202* (2013.01); *C10G 2300/301* (2013.01); *C10G 2300/302* (2013.01); *C10G 2300/304* (2013.01); *C10G 2300/308* (2013.01); *C10G 2300/4006* (2013.01); *C10G 2300/4012* (2013.01); *C10G 2300/4018* (2013.01); *C10G 2400/10* (2013.01); *C10M 2203/1006* (2013.01); *C10N 2030/02* (2013.01)

(58) Field of Classification Search
CPC ...... B01J 2029/062; B01J 23/42; B01J 29/74; B01J 29/7446; B01J 29/7461; B01J 29/7469; B01J 29/80; B01J 37/0201; B01J 37/04; B01J 37/088; C10G 2300/202; C10G 2300/301; C10G 2300/302; C10G 2300/304; C10G 2300/308; C10G 2300/4006; C10G 2300/4012; C10G 2300/4018; C10G 2400/10; C10G 45/64; C10M 109/02; C10M 177/00; C10M 2203/1006; C10N 2030/02

See application file for complete search history.

(56) References Cited

U.S. PATENT DOCUMENTS

| | | | |
|---|---|---|---|
| 9,920,260 B2 * | 3/2018 | Ojo | ........ B01J 29/7446 |
| 2010/0075831 A1 * | 3/2010 | Elia | ............ B01J 29/80 |
| | | | 502/67 |
| 2011/0124940 A1 | 5/2011 | Burton, Jr. | |
| 2017/0058209 A1 | 3/2017 | Ojo et al. | |
| 2017/0335216 A1 | 11/2017 | Hommeltoft | |

OTHER PUBLICATIONS

International Search Report, issued on Mar. 17, 2022, during the prosecution of International Application No. PCT/US2021/060313.
Written Opinion of the International Searching Authority, issued on Mar. 17, 2022, during the prosecution of International Application No. PCT/US2021/060313.

* cited by examiner

*Primary Examiner* — Ellen M McAvoy
*Assistant Examiner* — Chantel Graham
(74) *Attorney, Agent, or Firm* — Mark Warzel

(57) ABSTRACT

An improved hydroisomerization catalyst and process for making a base oil product using a catalyst comprising SSZ-91 molecular sieve and ZSM-12 molecular sieve. The catalyst and process generally involves the use of a catalyst comprising an SSZ-91 molecular sieve combined with a ZSM-12 molecular sieve to produce dewaxed base oil products by contacting the catalyst with a hydrocarbon feedstock. The catalyst and process provide improved base oil cold properties, such as pour point and cloud point, along with other beneficial base oil properties.

17 Claims, No Drawings

CATALYST AND PROCESS USING SSZ-91 AND ZSM-12

CROSS REFERENCE TO RELATED APPLICATIONS

This application is the national stage application of International Appl. No. PCT/US2021/060313 (doc. no. T-11321), filed on Nov. 22, 2021, and is related to, and claims the benefit of priority to U.S. patent application Ser. No. 17/105,614, filed on Nov. 26, 2020, entitled "CATALYST AND PROCESS USING SSZ-91 AND ZSM-12", the disclosures of which are herein incorporated in their entirety.

FIELD OF THE INVENTION

A hydroisomerization catalyst and process having improved thermal stability for producing base oils from hydrocarbon feedstocks using catalysts comprising an SSZ-91 molecular sieve and a ZSM-12 molecular sieve.

BACKGROUND OF THE INVENTION

A hydroisomerization catalytic dewaxing process for the production of base oils from a hydrocarbon feedstock involves introducing the feed into a reactor containing a dewaxing catalyst system with the presence of hydrogen. Within the reactor, the feed contacts the hydroisomerization catalyst under hydroisomerization dewaxing conditions to provide an isomerized stream. Hydroisomerization removes aromatics and residual nitrogen and sulfur and isomerize the normal paraffins to improve the base oil cold properties. The isomerized stream may be further contacted in a second reactor with a hydrofinishing catalyst to remove traces of any aromatics, olefins, improve color, and the like from the base oil product. The hydrofinishing unit may include a hydrofinishing catalyst comprising an alumina support and a noble metal, typically palladium, or platinum in combination with palladium.

The challenges generally faced in typical hydroisomerization catalytic dewaxing processes include, among others, providing product(s) that meet pertinent product specifications, such as cloud point, pour point, viscosity and/or viscosity index limits for one or more products, while also maintaining good product yield. In addition, further upgrading, e.g., during hydrofinishing, to further improve product quality may be used, e.g., for color and oxidation stability by saturating aromatics to reduce the aromatics content. The presence of residual organic sulfur and nitrogen from upstream hydrotreatment and hydrocracking processes, however, may have a significant impact on downstream processes and final base oil product quality.

Dewaxing of straight chain paraffins involves a number of hydroconversion reactions, including hydroisomerization, redistribution of branches, and secondary hydroisomerization. Consecutive hydroisomerization reactions lead to an increased degree of branching accompanied by a redistribution of branches. Increased branching generally increases the probability of chain cracking, leading to greater fuels yield and a loss of base oil/lube yield. Minimizing such reactions, including the formation of hydroisomerization transition species, can therefore lead to increased base oil/lube yield.

A more robust catalyst for base oil/lube production is therefore needed to isomerize wax molecules and provide improved base oil/lube product properties by reducing undesired cracking and hydroisomerization reactions. Accordingly, a continuing need exists for catalysts, catalyst systems, and processes to produce base oil/lube products, while also providing good base oil/lube product properties and product yield.

SUMMARY OF THE INVENTION

This invention relates to a hydroisomerization catalyst and process for converting wax-containing hydrocarbon feedstocks into high-grade products, including base or lube oils generally having improved base oil product cold properties. The catalyst and process employ a catalyst comprising a catalyst composition comprising an SSZ-91 molecular sieve and a ZSM-12 molecular sieve. The catalyst composition is used in the process by providing an appropriate hydrocarbon feedstock and contacting the catalyst with the feedstock to provide a product followed by contacting the first stage product with the other catalyst composition to provide a second stage product. The hydroisomerization process converts aliphatic, unbranched paraffinic hydrocarbons (n-paraffins) to isoparaffins and cyclic species, thereby decreasing the pour point and cloud point of the base oil product as compared with the feedstock. Catalysts formed from the combination of SSZ-91 and ZSM-12 molecular sieves have been found to advantageously provide base oil products having improved base oil/lube product cold properties as compared with base oil products produced using SSZ-91 catalysts by themselves. In some cases, the finished hydroisomerization catalyst is particularly well-suited for hydroprocessing heavy feedstocks and for producing bright stock.

In one aspect, the present invention is directed to a hydroisomerization catalyst and process, which are useful to make dewaxed products including base oils, particularly base oil products of one or more product grades through hydroprocessing of a suitable hydrocarbon feedstream. While not necessarily limited thereto, one of the goals of the invention is to provide improved base oil product cold properties such as pour point and cloud point while also providing other beneficial base oil product characteristics.

The catalyst composition generally comprises an SSZ-91 molecular sieve and a ZSM-12 molecular sieve. A matrix material and at least one modifier selected from Groups 6 to 10 and Group 14 of the Periodic Table may also be present in the catalyst composition. The modifier may further comprise a Group 2 metal of the Periodic Table.

The hydroisomerization process generally comprises contacting a hydrocarbon feedstock with the hydroisomerization catalyst under hydroisomerization conditions to produce a base oil product or product stream. The feedstock may also be first contacted with the catalyst composition to provide a first product followed by contacting the first product with one or more other catalyst compositions as may be needed, including, e.g., hydrofinishing and/or other catalyst systems to provide a second product. The feedstock may also be first contacted with other catalyst systems, e.g., pre-treatment or guard catalyst systems, prior to contacting one or more streams from such systems with the hydroisomerization catalyst. The product from the hydroisomerization catalyst may itself be a base oil product, or may be used to make a base oil product. For example, in some embodiments, the process may provide a base oil product having a viscosity index of at least about 109 and/or a pour point or cloud point of no greater than about −12° C. or −15° C.

DETAILED DESCRIPTION

Although illustrative embodiments of one or more aspects are provided herein, the disclosed processes may be implemented using any number of techniques. The disclosure is not limited to the illustrative or specific embodiments, drawings, and techniques illustrated herein, including any exemplary designs and embodiments illustrated and described herein, and may be modified within the scope of the appended claims along with their full scope of equivalents.

Unless otherwise indicated, the following terms, terminology, and definitions are applicable to this disclosure. If a term is used in this disclosure but is not specifically defined herein, the definition from the IUPAC Compendium of Chemical Terminology, 2nd ed (1997), may be applied, provided that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein is to be understood to apply.

"API gravity" refers to the gravity of a petroleum feedstock or product relative to water, as determined by ASTM D4052-11.

"Viscosity index" (VI) represents the temperature dependency of a lubricant, as determined by ASTM D2270-10 (E2011).

"Vacuum gas oil" (VGO) is a byproduct of crude oil vacuum distillation that can be sent to a hydroprocessing unit or to an aromatic extraction for upgrading into base oils. VGO generally comprises hydrocarbons with a boiling range distribution between 343° C. (649° F.) and 593° C. (1100° F.) at 0.101 MPa.

"Treatment," "treated," "upgrade," "upgrading" and "upgraded," when used in conjunction with an oil feedstock, describes a feedstock that is being or has been subjected to hydroprocessing, or a resulting material or crude product, having a reduction in the molecular weight of the feedstock, a reduction in the boiling point range of the feedstock, a reduction in the concentration of asphaltenes, a reduction in the concentration of hydrocarbon free radicals, and/or a reduction in the quantity of impurities, such as sulfur, nitrogen, oxygen, halides, and metals.

"Hydroprocessing" refers to a process in which a carbonaceous feedstock is brought into contact with hydrogen and a catalyst, at a higher temperature and pressure, for the purpose of removing undesirable impurities and/or converting the feedstock to a desired product. Examples of hydroprocessing processes include hydrocracking, hydrotreating, catalytic dewaxing, and hydrofinishing.

"Hydrocracking" refers to a process in which hydrogenation and dehydrogenation accompanies the cracking/fragmentation of hydrocarbons, e.g., converting heavier hydrocarbons into lighter hydrocarbons, or converting aromatics and/or cycloparaffins (naphthenes) into non-cyclic branched paraffins.

"Hydrotreating" refers to a process that converts sulfur and/or nitrogen-containing hydrocarbon feeds into hydrocarbon products with reduced sulfur and/or nitrogen content, typically in conjunction with hydrocracking, and which generates hydrogen sulfide and/or ammonia (respectively) as byproducts. Such processes or steps performed in the presence of hydrogen include hydrodesulfurization, hydrodenitrogenation, hydrodemetallation, and/or hydrodearomatization of components (e.g., impurities) of a hydrocarbon feedstock, and/or for the hydrogenation of unsaturated compounds in the feedstock. Depending on the type of hydrotreating and the reaction conditions, products of hydrotreating processes may have improved viscosities, viscosity indices, saturates content, low temperature properties, volatilities and depolarization, for example. The terms "guard layer" and "guard bed" may be used herein synonymously and interchangeably to refer to a hydrotreating catalyst or hydrotreating catalyst layer. The guard layer may be a component of a catalyst system for hydrocarbon dewaxing, and may be disposed upstream from at least one hydroisomerization catalyst.

"Catalytic dewaxing", or hydroisomerization, refers to a process in which normal paraffins are isomerized to their more branched counterparts by contact with a catalyst in the presence of hydrogen.

"Hydrofinishing" refers to a process that is intended to improve the oxidation stability, UV stability, and appearance of the hydrofinished product by removing traces of aromatics, olefins, color bodies, and solvents. UV stability refers to the stability of the hydrocarbon being tested when exposed to UV light and oxygen. Instability is indicated when a visible precipitate forms, usually seen as Hoc or cloudiness, or a darker color develops upon exposure to ultraviolet light and air. A general description of hydrofinishing may be found in U.S. Pat. Nos. 3,852,207 and 4,673,487.

The term "Hydrogen" or "hydrogen" refers to hydrogen itself, and/or a compound or compounds that provide a source of hydrogen.

"Cut point" refers to the temperature on a True Boiling Point (TBP) curve at which a predetermined degree of separation is reached.

"Pour point" refers to the temperature at which an oil will begin to flow under controlled conditions. The pour point may be determined by, for example, ASTM D5950.

"Cloud point" refers to the temperature at which a lube base oil sample begins to develop a haze as the oil is cooled under specified conditions. The cloud point of a lube base oil is complementary to its pour point. Cloud point may be determined by, for example, ASTM D5773.

"TBP" refers to the boiling point of a hydrocarbonaceous feed or product, as determined by Simulated Distillation (SimDist) by ASTM D2887-13.

"Hydrocarbonaceous", "hydrocarbon" and similar terms refer to a compound containing only carbon and hydrogen atoms. Other identifiers may be used to indicate the presence of particular groups, if any, in the hydrocarbon (e.g., halogenated hydrocarbon indicates the presence of one or more halogen atoms replacing an equivalent number of hydrogen atoms in the hydrocarbon).

The term "Periodic Table" refers to the version of the IUPAC Periodic Table of the Elements dated Jun. 22, 2007, and the numbering scheme for the Periodic Table Groups is as described in Chem. Eng. News, 63(5), 26-27 (1985). "Group 2" refers to IUPAC Group 2 elements, e.g., magnesium, (Mg), Calcium (Ca), Strontium (Sr), Barium (Ba) and combinations thereof in any of their elemental, compound, or ionic form. "Group 6" refers to IUPAC Group 6 elements, e.g., chromium (Cr), molybdenum (Mo), and tungsten (W). "Group 7" refers to IUPAC Group 7 elements, e.g., manganese (Mn), rhenium (Re) and combinations thereof in any of their elemental, compound, or ionic form. "Group 8" refers to IUPAC Group 8 elements, e.g., iron (Fe), ruthenium (Ru), osmium (Os) and combinations thereof in any of their elemental, compound, or ionic form. "Group 9" refers to IUPAC Group 9 elements, e.g., cobalt (Co), rhodium (Rh), iridium (Ir) and combinations thereof in any of their elemental, compound, or ionic form. "Group 10" refers to IUPAC Group 10 elements, e.g., nickel (Ni), palladium (Pd), platinum (Pt) and combinations thereof in any of their elemental, compound, or ionic form. "Group 14" refers to IUPAC Group 14 elements, e.g., germanium (Ge), tin (Sn), lead (Pb) and combinations thereof in any of their elemental, compound, or ionic form.

The term "support", particularly as used in the term "catalyst support", refers to conventional materials that are typically a solid with a high surface area, to which catalyst materials are affixed. Support materials may be inert or participate in the catalytic reactions, and may be porous or non-porous. Typical catalyst supports include various kinds of carbon, alumina, silica, and silica-alumina, e.g., amorphous silica aluminates, zeolites, alumina-boria, silica-alumina-magnesia, silica-alumina-titania and materials obtained by adding other zeolites and other complex oxides thereto.

"Molecular sieve" refers to a material having uniform pores of molecular dimensions within a framework structure, such that only certain molecules, depending on the type of molecular sieve, have access to the pore structure of the molecular sieve, while other molecules are excluded, e.g., due to molecular size and/or reactivity. The term "molecular sieve" and "zeolite" are synonymous and include (a) intermediate and (b) final or target molecular sieves and molecular sieves produced by (1) direct synthesis or (2) post-crystallization treatment (secondary modification). Secondary synthesis techniques allow for the synthesis of a target material from an intermediate material by heteroatom lattice substitution or other techniques. For example, an aluminosilicate can be synthesized from an intermediate borosilicate by post-crystallization heteroatom lattice substitution of the Al for B. Such techniques are known, for example as described in U.S. Pat. No. 6,790,433. Zeolites, crystalline aluminophosphates and crystalline silicoaluminophosphates are representative examples of molecular sieves.

In this disclosure, while compositions and methods or processes are often described in terms of "comprising" various components or steps, the compositions and methods may also "consist essentially of" or "consist of" the various components or steps, unless stated otherwise.

The terms "a," "an," and "the" are intended to include plural alternatives, e.g., at least one. For instance, the disclosure of "a transition metal" or "an alkali metal" is meant to encompass one, or mixtures or combinations of more than one, transition metal or alkali metal, unless otherwise specified.

All numerical values within the detailed description and the claims herein are modified by "about" or "approximately" the indicated value, and take into account experimental error and variations that would be expected by a person having ordinary skill in the art.

In one aspect, the present invention is a hydroisomerization catalyst system, useful to make dewaxed products including base/lube oils, the catalyst comprising a catalyst composition comprising an SSZ-91 molecular sieve and a ZSM-12 molecular sieve. The catalyst composition may be arranged in conjunction with other catalysts such that a hydrocarbon feedstock may be sequentially contacted with either the hydroisomerization catalyst composition first to provide a first product followed by contacting the first product with the other catalyst composition(s) to provide a second product, or with the other catalyst composition(s) first followed by contacting one or more product streams from such other catalysts with the hydroisomerization catalyst. The hydroisomerization catalyst composition generally comprises an SSZ-91 molecular sieve and a ZSM-12 molecular sieve, along with other components, including, e.g., matrix (support) materials and at least one modifier selected from Groups 6 to 10 and Group 14 of the Periodic Table. The modifier may further comprise a Group 2 metal of the Periodic Table.

In a further aspect, the present invention concerns a hydroisomerization process, useful to make dewaxed products including base oils, the process comprising contacting a hydrocarbon feedstock with the hydroisomerization catalyst system under hydroisomerization conditions to produce a base oil product or product stream. As noted, the feedstock may be first contacted with the hydroisomerization catalyst composition to provide a first product followed by contacting the first product with one or more other catalyst compositions as needed to produce a second product, or may be first contacted with such other catalyst compositions as needed, followed by contacting one or more product streams from such catalyst compositions with the hydroisomerization catalyst. The first and/or second products from such arrangements may themselves be a base oil product, or may be used to make a base oil product.

The SSZ-91 molecular sieve used in the hydroisomerization catalyst system and process is described in, e.g., U.S. Pat. Nos. 9,802,830; 9,920,260; 10,618,816; and in WO2017/034823. The SSZ-91 molecular sieve generally comprises ZSM-48 type zeolite material, the molecular sieve having at least 70% polytype 6 of the total ZSM-48-type material; an EUO-type phase in an amount of between 0 and 3.5 percent by weight; and polycrystalline aggregate morphology comprising crystallites having an average aspect ratio of between 1 and 8. The silicon oxide to aluminum oxide mole ratio of the SSZ-91 molecular sieve may be in the range of 40 to 220 or 50 to 220 or 40 to 200. In some cases, the SSZ-91 molecular sieve may have at least 70% polytype 6 of the total ZSM-48-type material; an EUO-type phase in an amount of between 0 and 3.5 percent by weight; and polycrystalline aggregate morphology comprising crystallites having an average aspect ratio of between 1 and 8. In some cases, the SSZ-91 material is composed of at least 90% polytype 6 of the total ZSM-48-type material present in the product. The polytype 6 structure has been given the framework code *MRE by the Structure Commission of the International Zeolite Association. The term "*MRE-type molecular sieve" and "EUO-type molecular sieve" includes all molecular sieves and their isotypes that have been assigned the International Zeolite Association framework, as described in the *Atlas of Zeolite Framework Types*, eds. Ch. Baerlocher, L. B. Mccusker and D. H. Olson, Elsevier, 6th revised edition, 2007 and the Database of Zeolite Structures on the International Zeolite Association's website (http://www.iza-online.org).

The foregoing noted patents provide additional details concerning SSZ-91 molecular sieves, methods for their preparation, and catalysts formed therefrom.

Useful ZSM-12 molecular sieves are known from the patent and technical literature, and may be used in the hydroisomerization catalyst and process, e.g., as described in U.S. Pat. Nos. 8,101,811; 8,679,451; 5,558,851; 9,802, 831; 3,832,449 and 4,391,785, and the like. The ZSM-12 molecular sieve is generally a known MTW framework molecular sieve that is useful in many processes, including various catalytic reactions, and is available from commercial sources, such as Clariant, Zeolyst and China Catalyst Corp. In some cases, the silicon oxide to aluminum oxide mole ratio of the ZSM-12 molecular sieve may be in the range of 40 to 220 or 50 to 220 or 40 to 200.

The SSZ-91 and ZSM-12 molecular sieves of the catalyst composition is generally combined with a matrix material to form a base material. The base material may, e.g., be formed as a base extrudate by combining the molecular sieves with the matrix material, extruding the mixture to form shaped extrudates, followed by drying and calcining of the extrudate. The catalyst composition also typically further comprises at least one modifier selected from Groups 6 to 10 and Group 14, and optionally further comprising a Group 2 metal, of the Periodic Table. Modifiers may be added through the use of impregnation solutions comprising modifier compounds.

Suitable matrix materials for the catalyst composition include alumina, silica, ceria, titania, tungsten oxide, zirconia, or a combination thereof. In some embodiments, aluminas for the catalyst compositions and the process may also be a "high nanopore volume" alumina, abbreviated as "HNPV" alumina, as described in U.S. application Ser. No. 17/095,010, filed on Nov. 11, 2020, herein incorporated by reference. Suitable aluminas are commercially available, including, e.g., Catapal® aluminas and Pural® aluminas from Sasol or Versal® aluminas from UOP. In general, the alumina can be any alumina known for use as a matrix material in a catalyst base. For example, the alumina can be boehmite, bayerite, γ-alumina, η-alumina, θ-alumina, δ-alumina, χ-alumina, or a mixture thereof.

Suitable modifiers are selected from Groups 6-10 and Group 14 of the Periodic Table (IUPAC). Suitable Group 6 modifiers include Group 6 elements, e.g., chromium (Cr), molybdenum (Mo), and tungsten (W) and combinations thereof in any of their elemental, compound, or ionic form. Suitable Group 7 modifiers include Group 7 elements, e.g., manganese (Mn), rhenium (Re) and combinations thereof in any of their elemental, compound, or ionic form. Suitable Group 8 modifiers include Group 8 elements, e.g., iron (Fe), ruthenium (Ru), osmium (Os) and combinations thereof in any of their elemental, compound, or ionic form. Suitable Group 9 modifiers include Group 9 elements, e.g., cobalt (Co), rhodium (Rh), iridium (Ir) and combinations thereof in any of their elemental, compound, or ionic form. Suitable Group 10 modifiers include Group 10 elements, e.g., nickel (Ni), palladium (Pd), platinum (Pt) and combinations thereof in any of their elemental, compound, or ionic form. Suitable Group 14 modifiers include Group 14 elements, e.g., germanium (Ge), tin (Sn), lead (Pb) and combinations thereof in any of their elemental, compound, or ionic form. In addition, optional Group 2 modifiers may be present, including Group 2 elements, e.g., magnesium, (Mg), Calcium (Ca), Strontium (Sr), Barium (Ba) and combinations thereof in any of their elemental, compound, or ionic form.

The modifier advantageously comprises one or more Group 10 metals. The Group 10 metal may be, e.g., platinum, palladium or a combination thereof. Platinum is a suitable Group 10 metal along with another Groups 6 to 10 and Group 14 metal in some aspects. While not limited thereto, the Groups 6 to 10 and Group 14 metal may be more narrowly selected from Pt, Pd, Ni, Re, Ru, Ir, Sn, or a combination thereof. In conjunction with Pt as a first metal in the first and/or second catalyst compositions, an optional second metal in the catalyst composition may also be more narrowly selected from the Groups 6 to 10 and Group 14 metals, such as, e.g., Pd, Ni, Re, Ru, Ir, Sn, or a combination thereof. In a more specific instance, the catalyst may comprise Pt as a Group 10 metal in an amount of 0.01-5.0 wt. % or 0.01-2.0 wt. %, or 0.1-2.0 wt. %, more particularly 0.01-1.0 wt. % or 0.3-0.8 wt. %. An optional second metal selected from Pd, Ni, Re, Ru, Ir, Sn, or a combination thereof as a Group 6 to 10 and Group 14 metal may be present, in an amount of 0.01-5.0 wt. % or 0.01-2.0 wt. %, or 0.1-2.0 wt. %, more particularly 0.01-1.0 wt. % and 0.01-1.5 wt. %.

The metals content in the catalyst composition may be varied over useful ranges, e.g., the total modifying metals content for the catalyst may be 0.01-5.0 wt. % or 0.01-2.0 wt. %, or 0.1-2.0 wt. % (total catalyst weight basis). In some instances, the catalyst composition comprises 0.1-2.0 wt. % Pt as one of the modifying metals and 0.01-1.5 wt. % of a second metal selected from Groups 6 to 10 and Group 14, or 0.3-1.0 wt. % Pt and 0.03-1.0 wt. % second metal, or 0.3-1.0 wt. % Pt and 0.03-0.8 wt. % second metal. In some cases, the ratio of the first Group 10 metal to the optional second metal selected from Groups 6 to 10 and Group 14 may be in the range of 5:1 to 1:5, or 3:1 to 1:3, or 1:1 to 1:2, or 5:1 to 2:1, or 5:1 to 3:1, or 1:1 to 1:3, or 1:1 to 1:4. In more specific cases, the catalyst composition comprises 0.01 to 5.0 wt. % of the modifying metal, 1 to 99 wt. % of the matrix material, and 0.1 to 99 wt. % of the SSZ-91 and ZSM-12 molecular sieves. In some cases, the ZSM-12 molecular sieve is used as a minor component of the catalyst composition relative to the amount of the SSZ-95 molecular sieve. In particular, ZSM-12 contents in the range of about 1 wt. % to about 15 wt. % or less (total catalyst weight basis), more specifically, in the range from about 1 wt. % to about 12 wt. %, have been found to be useful to provide improved (reduced) pour point and cloud point properties. In some cases, a ZSM-12 content in the range from about 1 wt. % to about 8 wt. % (total catalyst weight basis) provides advantageous cold properties.

The base extrudate may be made according to any suitable method. For example, the base extrudates for the first and/or second catalyst compositions may be conveniently made by mixing the components together and extruding the well mixed SSZ-91+ZSM-12/matrix material mixture to form the base extrudate. The extrudate is next dried and calcined, followed by loading of any modifiers onto the base extrudate. Suitable impregnation techniques may be used to disperse the modifiers onto the base extrudate. The method of making the base extrudate is not intended to be particularly limited according to specific process conditions or techniques, however.

While not limited thereto, exemplary process conditions may include cases wherein the SSZ-91 molecular sieve, the ZSM-12 molecular sieve, any added matrix material and any added liquid are mixed together at about 20 to 80° C. for about 0.5 to 30 min.; the extrudate is formed at about 20 to 80° C. and dried at about 90-150° C. for 0.5-8 hrs; the extrudate is calcined at 260-649° C. (500-1200° F.), in the presence of sufficient air flow, for 0.1-10 hours; the extrudate is impregnated with a modifier by contacting the extrudate with the metal impregnation solution containing at least one modifier for 0.1-10 hrs at a temperature in the range of about 20 to 80° C.; and the metal loaded extrudate is dried at about 90-150° C. for 0.1-10 hrs and calcined at 260-649° C. (500-1200° F.), in the presence of sufficient air flow, for 0.1-10 hours.

The hydrocarbon feed may generally be selected from a variety of base oil feedstocks, and advantageously comprises gas oil; vacuum gas oil; long residue; vacuum residue; atmospheric distillate; heavy fuel; oil; wax and paraffin; used oil; deasphalted residue or crude; charges resulting from thermal or catalytic conversion processes; shale oil; cycle oil; animal and vegetable derived fats, oils and waxes; petroleum and slack wax; or a combination thereof. The hydrocarbon feed may also comprise a feed hydrocarbon cut in the distillation range from 400-1300° F., or 500-1100° F., or 600-1050° F., and/or wherein the hydrocarbon feed has a KV100 (kinematic viscosity at 100° C.) range from about 3 to 30 cSt or about 3.5 to 15 cSt.

In some cases, the process may be used advantageously for a light or heavy neutral base oil feedstock, such as a vacuum gas oil (VGO), as the hydrocarbon feed where the SSZ-91 and ZSM-12 catalyst composition includes a Pt modifying metal, or a combination of Pt with another modifier.

The product(s), or product streams, may be used to produce one or more base oil products, e.g., to produce multiple grades having a KV100 in the range of about 2 to 30 cSt. Such base oil products may, in some cases, have a pour point of not more than about −12° C., or −15° C., or −20° C.

The hydroisomerization catalyst and process may also be combined with additional process steps, or system components, e.g., the feedstock may be further subjected to hydrotreating conditions with a hydrotreating catalyst prior to contacting the hydrocarbon feedstock with the hydroisomerization catalyst composition, optionally, wherein the hydrotreating catalyst comprises a guard layer catalyst comprising a refractory inorganic oxide material containing about 0.1 to 1 wt. % Pt and about 0.2 to 1.5 wt. % Pd.

Among the advantages provided by the present process and hydroisomerization catalyst, are the improvement in cold properties of the base oil product produced using the combination of the SSZ-91 and ZSM-12 molecular sieves, as compared with the same process wherein only an SSZ-91 catalyst composition is used. For example, the base oil pour point and/or cloud point may be notably decreased by at least about 1° C. or 3° C. or 5° C. or 10° C., when the combination of the SSZ-91 and ZSM-12 molecular sieves is used in the catalyst composition, as compared with the use, in the same process, of only an SSZ-91 molecular sieve in the catalyst composition.

In practice, hydrodewaxing is used primarily for reducing the pour point and/or for reducing the cloud point of the base oil by removing wax from the base oil. Typically, dewaxing uses a catalytic process for processing the wax, with the dewaxer feed is generally upgraded prior to dewaxing to increase the viscosity index, to decrease the aromatic and heteroatom content, and to reduce the amount of low boiling components in the dewaxer feed. Some dewaxing catalysts accomplish the wax conversion reactions by cracking the waxy molecules to lower molecular weight molecules. Other dewaxing processes may convert the wax contained in the hydrocarbon feed to the process by wax isomerization, to produce isomerized molecules that have a lower pour point than the non-isomerized molecular counterparts. As used herein, isomerization encompasses a hydroisomerization process, for using hydrogen in the isomerization of the wax molecules under catalytic hydroisomerization conditions.

Suitable hydrodewaxing conditions generally depend on the feed used, the catalyst used, desired yield, and the desired properties of the base oil. Typical conditions include a temperature of from 500° F. to 775° F. (260° C. to 413° C.); a pressure of from 15 psig to 3000 psig (0.10 MPa to 20.68 MPa gauge); a LHSV of from 0.25 hr$^{-1}$ to 20 hr$^{-1}$; and a hydrogen to feed ratio of from 2000 SCF/bbl to 30,000 SCF/bbl (356 to 5340 m$^3$ H$_2$/m$^3$ feed). Generally, hydrogen will be separated from the product and recycled to the isomerization zone. Generally, dewaxing processes of the present invention are performed in the presence of hydrogen. Typically, the hydrogen to hydrocarbon ratio may be in a range from about 2000 to about 10,000 standard cubic feet H$_2$ per barrel hydrocarbon, and usually from about 2500 to about 5000 standard cubic feet H$_2$ per barrel hydrocarbon. The above conditions may apply to the hydrotreating conditions of the hydrotreating zone as well as to the hydroisomerization conditions of the first and second catalyst. Suitable dewaxing conditions and processes are described in, e.g., U.S. Pat. Nos. 5,135,638; 5,282,958; and 7,282,134.

While the catalyst system and process has been generally described in terms of the hydroisomerization catalyst composition comprising the SSZ-91 and ZSM-12 molecular sieves, it should be understood that additional catalysts, including layered catalysts and treatment steps may be present, e.g., including, hydrotreating catalyst(s)/steps, guard layers, and/or hydrofinishing catalyst(s)/steps.

EXAMPLES

SSZ-91 was synthesized according to U.S. Pat. No. 10,618,816 and ZSM-12 was provided from a commercial source, e.g., Clariant, Zeolyst, China Catalyst Group. The aluminas were provided as Catapal® aluminas and Pural® aluminas from Sasol or Versal® aluminas from UOP. The SSZ-91 molecular sieve had a silica-alumina ratio (SAR) of 120 or less.

Example 1—Hydroisomerization Catalyst Preparation

Hydroisomerization catalyst A (comparative) was prepared as follows: crystallite SSZ-91 was composited with Sasol Catapal® alumina to provide a mixture containing 65 wt. % SSZ-91 zeolite. The mixture was extruded, dried, and calcined, and the dried and calcined extrudate was impregnated with a solution containing platinum. The overall platinum loading was 0.6 wt. %.

Example 2—Hydroisomerization Catalyst B Preparation

Hydroisomerization catalyst B was prepared as described for Catalyst A to provide a mixture containing 64 wt. % SSZ-91, 1 wt. % ZSM-12 and 35 wt. % Sasol Catapal® alumina. The dried and calcined extrudate was impregnated with platinum to provide an overall platinum loading of 0.6 wt. %.

Example 3—Hydroisomerization Catalyst C Preparation

Hydroisomerization catalyst C was prepared as described for Catalyst A to provide a mixture containing 60 wt. % SSZ-91, 5 wt. % ZSM-12 and 35 wt. % Sasol Catapal® alumina. The dried and calcined extrudate was impregnated with platinum to provide an overall platinum loading of 0.6 wt. %.

Example 4—Hydroisomerization Performance of Catalysts A, B and C

Catalysts A, B and C were used to hydroisomerize a neutral vacuum gas oil (VGO) hydrocrackate feedstock having the properties shown in Table 1.

TABLE 1

| Feedstock Property | Value |
|---|---|
| gravity, ° API | 29.6 |
| Sulfur content, wt. % | 32 |
| Nitrogen content, wt. % | 1.0 |
| Viscosity Index, VI | 111 |
| viscosity at 100° C. (cSt) | 11.42 |

TABLE 1-continued

| Feedstock Property | Value |
|---|---|
| viscosity at 70° C. (cSt) | 26.98 |
| SIMDIST Distillation Temperature (wt. %), ° F. | |
| 5 | 808 |
| 30 | 909 |
| 50 | 950 |
| 70 | 990 |
| 90 | 1043 |

Hydroisomerization reactions were performed in a straight through micro unit fixed bed reactor (without recycle) and with only the feedstock and hydrogen fed to the reactor. The runs were operated under 2100 psig total pressure. Feedstock was passed through the hydroisomerization reactor containing one of catalysts A, B or C at a liquid hourly space velocity (LHSV) of 1.2 hr$^{-1}$. The hydrogen to oil ratio was about 3000 scfb. The reactor temperature range was 590-650° F. with each run using catalysts A, B and C conducted at approximately the same reactor temperature. The base oil product was separated from fuels through a distillation section. Pour point and cloud point results were collected for each of the base oil products produced using catalysts A, B and C.

Table 2 summarizes the catalyst compositions and the pour and cloud point cold properties.

TABLE 2

| Catalyst Molecular Sieve | Catalyst A | Catalyst B | Catalyst C |
|---|---|---|---|
| SSZ-91 (wt. %) | 65 | 64 | 60 |
| ZSM-12 (wt. %) | 0 | 1 | 5 |
| Base oil Property | | | |
| Pour point, ° C. | −19 | −17 | −33 |
| Cloud point, ° C. | −12 | −12 | −28 |

Compared to catalyst A (SSZ-91 only), catalyst C provided significantly improved base oil cold properties, including the pour point and cloud point.

The foregoing description of one or more embodiments of the invention is primarily for illustrative purposes, it being recognized that variations might be used which would still incorporate the essence of the invention. Reference should be made to the following claims in determining the scope of the invention.

For the purposes of U.S. patent practice, and in other patent offices where permitted, all patents and publications cited in the foregoing description of the invention are incorporated herein by reference to the extent that any information contained therein is consistent with and/or supplements the foregoing disclosure.

What is claimed is:

1. A hydroisomerization catalyst, useful to make dewaxed products including base oils having improved cloud and pour points, comprising
   a catalyst composition comprising an SSZ-91 molecular sieve and a ZSM-12 molecular sieve;
      wherein, the ZSM-12 molecular sieve is present in an amount from about 1.0 to 15.0 wt. %.

2. The catalyst of claim 1, wherein the SSZ-91 molecular sieve and the ZSM-12 molecular sieve are combined with a matrix material to form a base material, and wherein the catalyst further comprises at least one modifier selected from Groups 6 to 10 and Group 14, and optionally further comprising a Group 2 metal, of the Periodic Table.

3. The catalyst of claim 1, wherein the SSZ-91 molecular sieve comprises ZSM-48 type zeolite material, the molecular sieve having:
   at least 70 wt. % polytype 6 of the total ZSM-48-type material;
   an EUO-type phase in an amount of between 0 and 3.5 percent by weight; and
   polycrystalline aggregate morphology comprising crystallites having an average aspect ratio of between 1 and 8.

4. The catalyst of claim 1, wherein the silicon oxide to aluminum oxide mole ratio of the SSZ-91 molecular sieve and/or the ZSM-12 molecular sieve is in the range of 40 to 220 or 50 to 220 or 40 to 200, or 50 to 140.

5. The catalyst of claim 3, wherein the SSZ-91 molecular sieve comprises one or more of:
   at least 80 wt. % polytype 6 of the total ZSM-48-type material;
   between 0.1 and 2 wt. % EU-1;
   crystallites having an average aspect ratio of between 1 and 5, or between 1 and 3;
   or a combination thereof.

6. The catalyst of claim 2, wherein the modifier content is 0.01-5.0 wt. % or 0.01-2.0 wt. %, or 0.1-2.0 wt. % (total catalyst weight basis).

7. The catalyst of claim 2, wherein the catalyst comprises Pt, or a combination of Pt and Pd, as the modifier in an amount of 0.01-1.0 wt. %, or 0.3-0.8 wt. % Pt or the combination of Pt and Pd, optionally further comprising Mg.

8. The catalyst of claim 2, wherein the matrix material is selected from alumina, silica, ceria, titania, tungsten oxide, zirconia, or a combination thereof.

9. The catalyst of claim 2, wherein the catalyst comprises 0.01 to 5.0 wt. % of the modifier, from greater than 0 to 99 wt. % of the matrix material, and 0.1 to 99 wt. % of the SSZ-91 and ZSM-12 molecular sieves.

10. The catalyst of claim 9, wherein the ZSM-12 molecular sieve is present in an amount of about 1 to 15 wt. % or about 1 to 12 wt. %.

11. The catalyst of claim 1, wherein the catalyst is suitable to produce a base oil product having a viscosity index of at least about 109 and/or a pour point or a cloud point of no greater than about −12° C.

12. A process for producing a base oil product having reduced base oil pour point and/or cloud point, the process comprising contacting a hydrocarbon feedstock with the hydroisomerization catalyst of claim 1 under hydroisomerization conditions to produce a base oil product, wherein the base oil pour point and/or the base oil cloud point is reduced using the catalyst of claim 1 as compared with the same process using a catalyst comprising the same SSZ-91 molecular sieve but excluding the ZSM-12 molecular sieve.

13. The process of claim 12, wherein the hydrocarbon feedstock comprises gas oil; vacuum gas oil; long residue; vacuum residue; atmospheric distillate; heavy fuel; oil; wax and paraffin; used oil; deasphalted residue or crude; charges resulting from thermal or catalytic conversion processes; shale oil; cycle oil; animal and vegetable derived fats, oils and waxes; petroleum and slack wax; or a combination thereof.

14. The process of claim 12, wherein the base oil pour point and/or the base oil cloud point is reduced by at least about 1° C. using the catalyst of claim 1 as compared with the same process using a catalyst comprising the same SSZ-91 molecular sieve but excluding the ZSM-12 molecular sieve.

15. The process of claim 12, wherein the catalyst is suitable to produce a base oil product having a viscosity index of at least about 109 and/or a pour point or a cloud point of no greater than about −12° C.

16. A process for making the hydroisomerization catalyst of claim 1, comprising mixing together the SSZ-91 molecular sieve, the ZSM-12 molecular sieve, any added matrix material and sufficient liquid to form an extrudable paste; extruding the paste to form an extrudate base; impregnating the extrudate base with a metal impregnation solution containing at least one modifier selected from Groups 6 to 10 and Group 14, and optionally further comprising a Group 2 metal, of the Periodic Table, to form a metal loaded extrudate; and subjecting the metal loaded extrudate to drying and calcination post-treatment conditions.

17. The process of claim 16, wherein
the SSZ-91 molecular sieve, the ZSM-12 molecular sieve, any added matrix material and the liquid are mixed together at about 20 to 80° C. for about 0.5 to 30 min.;
the extrudate is formed at about 20 to 80° C. and dried at about 90-150° C. for 0.5-8 hrs;
the extrudate is calcined at 260-649° C. (500-1200° F.), in the presence of air flow, for 0.1-10 hours;
the extrudate is impregnated with a modifier by contacting the extrudate with the metal impregnation solution containing at least one modifier for 0.1-10 hrs at a temperature in the range of about 20 to 80° C.; and
the metal loaded extrudate is dried at about 90-150° C. for 0.1-10 hrs and calcined at 260-649° C. (500-1200° F.), in the presence of sufficient air flow, for 0.1-10 hours.

\* \* \* \* \*